US009505132B1

(12) United States Patent
Bingham et al.

(10) Patent No.: US 9,505,132 B1
(45) Date of Patent: Nov. 29, 2016

(54) METHODS AND SYSTEMS FOR CALIBRATING A SENSOR OF A ROBOTIC DEVICE

(71) Applicant: X Development LLC, Mountain View, CA (US)

(72) Inventors: Jeffrey Thomas Bingham, Mountain View, CA (US); Rob Wilson, Mountain View, CA (US); Adam Reich, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 14/673,165

(22) Filed: Mar. 30, 2015

(51) Int. Cl.
*B25J 9/00* (2006.01)
*B25J 9/16* (2006.01)

(52) U.S. Cl.
CPC ............. *B25J 9/1692* (2013.01); *B25J 9/1671* (2013.01)

(58) Field of Classification Search
CPC combination set(s) only.
See application file for complete search history.

(56) References Cited

U.S. PATENT DOCUMENTS

| 5,010,773 | A | * | 4/1991 | Lorenz | B25J 13/084 310/319 |
| 5,056,038 | A | * | 10/1991 | Kuno | B25J 9/1633 700/260 |
| 5,130,632 | A | * | 7/1992 | Ezawa | B25J 9/1674 318/568.11 |
| 5,201,772 | A | * | 4/1993 | Maxwell | A61F 5/0102 434/258 |
| 5,261,266 | A | * | 11/1993 | Lorenz | B25J 13/084 73/1.15 |
| 5,644,204 | A | * | 7/1997 | Nagle | B62D 57/032 318/568.12 |
| 5,767,648 | A | * | 6/1998 | Morel | B25J 9/1628 318/568.1 |
| 5,828,197 | A | * | 10/1998 | Martin | B25J 9/1689 318/560 |
| 5,994,864 | A | * | 11/1999 | Inoue | B25J 9/1633 318/568.2 |
| 6,088,020 | A | * | 7/2000 | Mor | G06F 3/016 318/628 |
| 7,145,306 | B2 | * | 12/2006 | Aihara | B25J 9/1602 318/568.12 |
| 7,327,348 | B2 | * | 2/2008 | Goldenberg | G05G 1/08 318/568.11 |

(Continued)

FOREIGN PATENT DOCUMENTS

WO 2014110682 A1 7/2014

*Primary Examiner* — Jonathan L Sample
(74) *Attorney, Agent, or Firm* — McDonnell Boehnen Hulbert & Berghoff LLP

(57) ABSTRACT

Examples are provided that describe calibration of a sensor of a robotic device. In one example, a system includes least one processor and data storage comprising instructions executable by the at least one processor to cause the system to perform operations. The operations include simulating a movement of a robotic component of a robotic device to a plurality of positions. The operations may also include determining a relationship between a simulated torque values and simulated force values at the plurality of positions. The operations may also include determining expected torque values based on detected force values and the determined relationship. Based on the expected torque values satisfying a threshold associated with the simulated torque values, determining a plurality of calibration parameters of the one or more sensors according to the optimization.

20 Claims, 10 Drawing Sheets

(56) References Cited

U.S. PATENT DOCUMENTS

| | | | | |
|---|---|---|---|---|
| 7,920,124 B2* | 4/2011 | Tokita | | G06F 3/011 |
| | | | | 345/156 |
| 8,050,780 B2* | 11/2011 | Tessier | | B64C 13/04 |
| | | | | 244/229 |
| 8,650,965 B2* | 2/2014 | Hashiguchi | | B25J 9/0087 |
| | | | | 73/763 |
| 8,805,584 B2* | 8/2014 | Yamane | | B62D 57/032 |
| | | | | 700/245 |
| 9,060,884 B2* | 6/2015 | Langlois | | A61F 2/68 |
| 2005/0230557 A1* | 10/2005 | Aghili | | B64G 7/00 |
| | | | | 244/158.1 |
| 2006/0071622 A1* | 4/2006 | Townsend | | B25J 9/1612 |
| | | | | 318/400.31 |
| 2007/0010898 A1* | 1/2007 | Hosek | | G05B 19/4148 |
| | | | | 700/2 |
| 2007/0067678 A1* | 3/2007 | Hosek | | G05B 23/0235 |
| | | | | 714/25 |
| 2007/0151390 A1* | 7/2007 | Blumenkranz | | B25J 15/0009 |
| | | | | 74/490.06 |
| 2008/0231221 A1* | 9/2008 | Ogawa | | B25J 5/007 |
| | | | | 318/568.12 |
| 2009/0024142 A1* | 1/2009 | Ruiz Morales | | B25J 9/041 |
| | | | | 606/130 |
| 2009/0259412 A1* | 10/2009 | Brogardh | | B25J 9/1633 |
| | | | | 702/41 |
| 2010/0094312 A1* | 4/2010 | Ruiz Morales | | B25J 13/085 |
| | | | | 606/130 |
| 2010/0113980 A1* | 5/2010 | Herr | | A61F 2/60 |
| | | | | 600/587 |
| 2010/0114329 A1* | 5/2010 | Casler | | B25J 19/0008 |
| | | | | 623/24 |
| 2010/0138038 A1* | 6/2010 | Moon | | B25J 13/085 |
| | | | | 700/245 |
| 2010/0243344 A1* | 9/2010 | Wyrobek | | B25J 5/007 |
| | | | | 180/21 |
| 2010/0300230 A1* | 12/2010 | Helmer | | B25J 9/106 |
| | | | | 74/469 |
| 2011/0071679 A1* | 3/2011 | Barajas | | B25J 9/1674 |
| | | | | 700/259 |
| 2011/0082566 A1* | 4/2011 | Herr | | A61F 2/60 |
| | | | | 623/24 |
| 2011/0130879 A1* | 6/2011 | Abdallah | | B25J 9/1615 |
| | | | | 700/260 |
| 2012/0010749 A1* | 1/2012 | Van Der Merwe | | A61F 2/54 |
| | | | | 700/264 |
| 2013/0012930 A1* | 1/2013 | Ruiz Morales | | B25J 13/085 |
| | | | | 606/1 |
| 2013/0310979 A1* | 11/2013 | Herr | | B62D 57/032 |
| | | | | 700/258 |
| 2014/0067124 A1* | 3/2014 | Williamson | | G05B 19/406 |
| | | | | 700/258 |
| 2014/0107843 A1* | 4/2014 | Okazaki | | B25J 13/085 |
| | | | | 700/260 |
| 2014/0201571 A1* | 7/2014 | Hosek | | G06F 11/2257 |
| | | | | 714/26 |
| 2014/0330432 A1* | 11/2014 | Simaan | | B25J 9/1625 |
| | | | | 700/250 |
| 2015/0105905 A1* | 4/2015 | Nishida | | B25J 9/1641 |
| | | | | 700/254 |
| 2015/0168496 A1* | 6/2015 | Moura | | G01L 3/22 |
| | | | | 702/182 |
| 2015/0323398 A1* | 11/2015 | Lauzier | | B25J 9/0081 |
| | | | | 73/862.08 |

\* cited by examiner

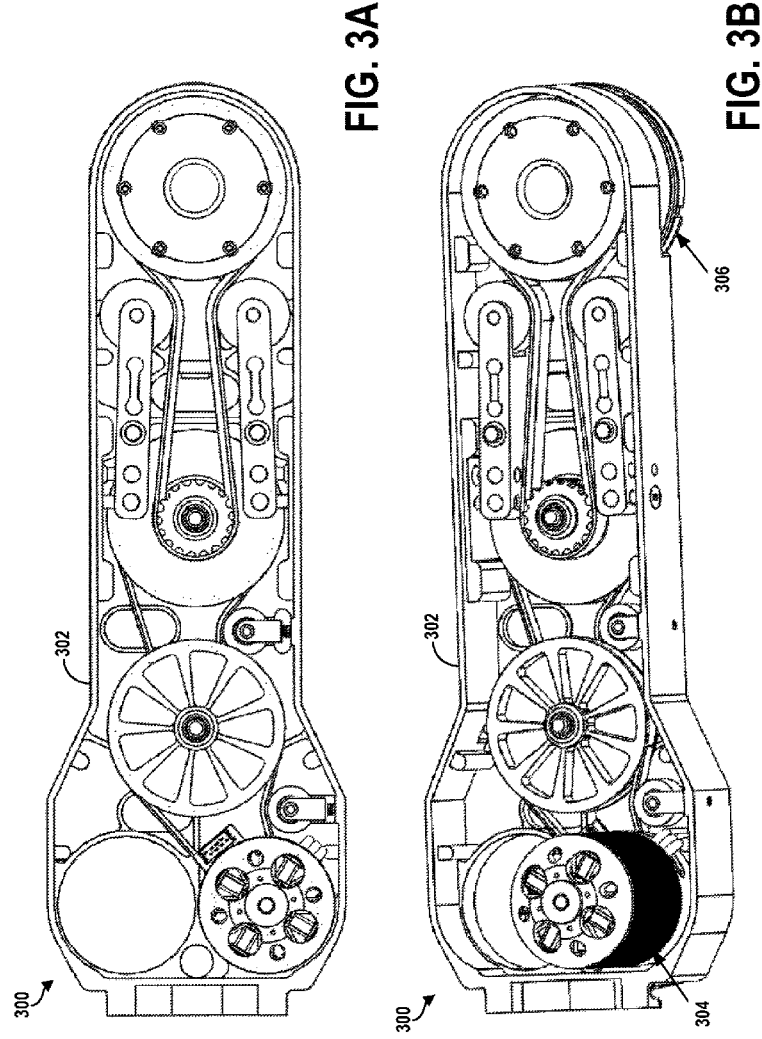

METHODS AND SYSTEMS FOR CALIBRATING A SENSOR OF A ROBOTIC DEVICE

BACKGROUND

Unless otherwise indicated herein, the materials described in this section are not prior art to the claims in this application and are not admitted to be prior art by inclusion in this section.

Robotic devices may be used for applications involving material handling, transportation, welding, assembly, and dispensing, among others. Over time, the manner in which these robotic systems operate is becoming more intelligent, efficient, and more intuitive. Robotic devices are being expected to move and operate to perform new tasks and functions. A demand for efficient robotic devices has helped open up a field of innovation in actuators, movement, sensing techniques, as well as component design and assembly. As the use of robotic devices becomes increasingly prevalent in numerous aspects of modern life, the need for increased collaboration between humans and robotic devices becomes apparent.

SUMMARY

In one example, a system includes at least one processor and data storage comprising instructions executable by the at least one processor to cause the system to perform operations. The operations include simulating a movement of a robotic component of a robotic device to a plurality of positions. The operations include determining a relationship between simulated torque values and simulated force values at the plurality of positions. A respective position of the plurality of positions is associated with a respective simulated torque value and a respective simulated force value. The operations include receiving detected force values by one or more sensors of the robotic component according to actuation of the robotic component to the plurality of positions. The respective position of the plurality of positions is associated with a respective detected force value according to a given sensor of the one or more sensors. The operations include determining expected torque values based on the detected force values and the determined relationship. Based on the expected torque values satisfying a threshold associated with the simulated torque values, the operations include determining a plurality of calibration parameters of the one or more sensors according to the determined relationship.

In another example, a method includes simulating a movement of a robotic component of a robotic device to a plurality of positions. The method includes receiving simulated torque values and simulated force values associated with the plurality of positions. A respective position of the plurality of positions is associated with a respective simulated torque value and a respective simulated force value. The simulated torque values are based on a simulated output of an actuator of the robotic component. The simulated force values are based on a simulated tension of a belt transmission of the robotic component. The method includes determining, by one or more computing devices, a mapping between the simulated torque values and the simulated force values. The method also includes receiving detected force values by one or more sensors of the robotic component according to actuation of the robotic component to the plurality of positions. The respective position of the plurality of positions is associated with a respective detected force value according to a given sensor of the one or more sensors. The method includes determining, by one or more computing devices, expected torque values based on the detected force values and the mapping. Based on the expected torque values satisfying a threshold associated with the simulated torque values, the method includes determining by the one or more computing devices, a plurality of calibration parameters of the one or more sensors according to the mapping.

In another example, a method includes actuating a robotic component of a robotic device to a plurality of positions. The robotic component is actuated by an actuator of the robotic device. The method includes determining data associated with the actuator using one or more sensors of the robotic device. The data is determined based on the robotic component at a respective position of the plurality of positions. The method includes receiving expected torque values of the actuator associated with the plurality of positions. The respective position of the plurality of positions is associated with a respective expected torque value. The expected torque values are based on one or more external measurements of the robotic component and the actuator. The method includes fitting, by one or more computing devices, the data to the expected torque values. Based on fitting the data, the method includes determining, by the one or more computing devices, one or more calibration parameters associated with the one or more sensors.

In another example, a system includes at least one processor and data storage comprising instructions executable by the at least one processor to cause the system to perform operations. The operations include means for simulating a movement of a robotic component of a robotic device to a plurality of positions. The operations include means for determining a relationship between simulated torque values and simulated force values at the plurality of positions. A respective position of the plurality of positions is associated with a respective simulated torque value and a respective simulated force value. The operations include means for receiving detected force values by one or more sensors of the robotic component according to actuation of the robotic component to the plurality of positions. The respective position of the plurality of positions is associated with a respective detected force value according to a given sensor of the one or more sensors. The operations include means for determining expected torque values based on the detected force values and the determined relationship. Based on the expected torque values satisfying a threshold associated with the simulated torque values, the operations include means for determining a plurality of calibration parameters of the one or more sensors according to the determined relationship.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 3A-3B illustrate side and internal views of another example actuator system.

DETAILED DESCRIPTION

Figure 1:
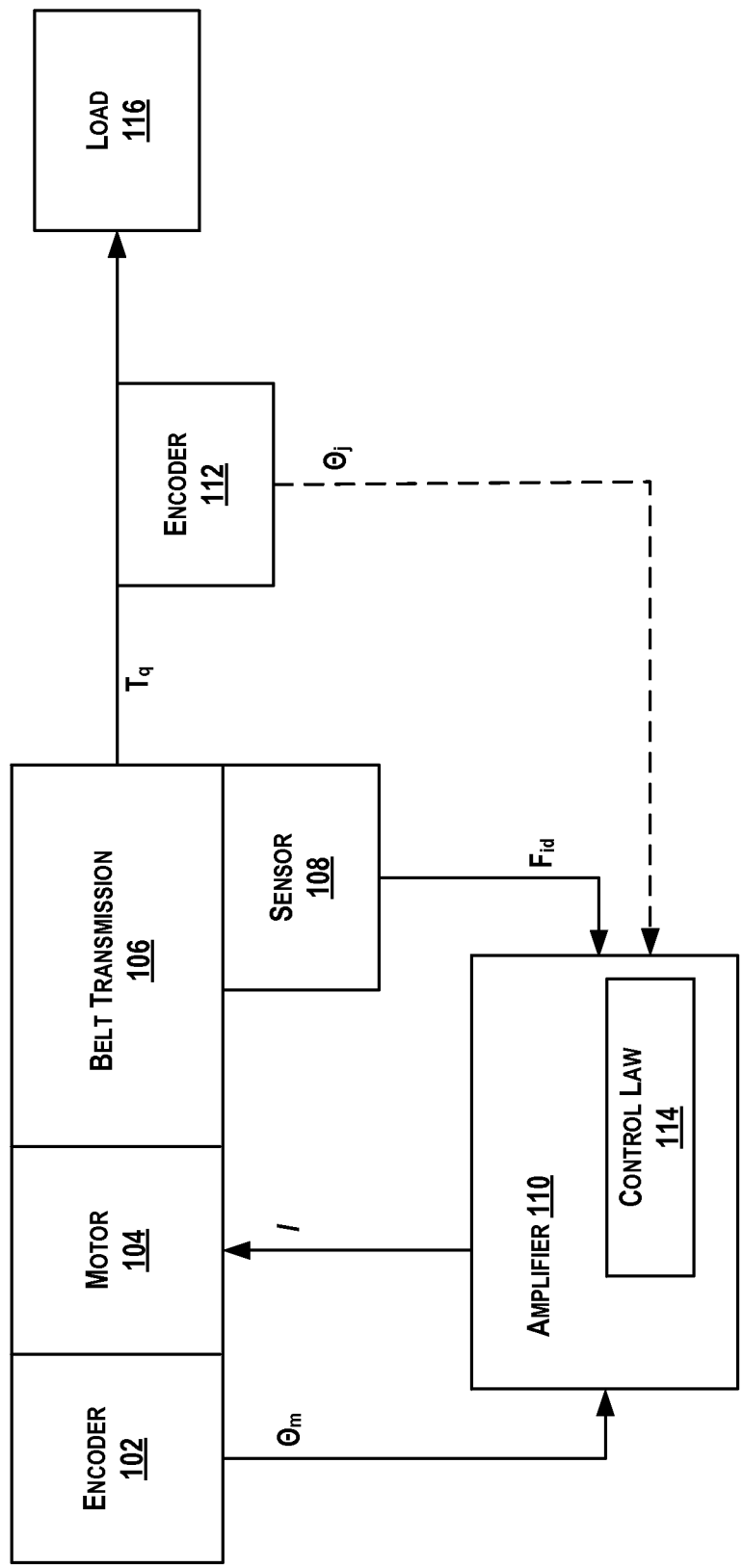
FIG. 1 illustrates an example torque controlled actuator.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a robotic device to calibrate a parameter of one or more sensors. In one example, a system comprising at least one processor and data storage comprising instructions executable by the at least one processor to cause the system to perform operations for calibrating the parameter.

The operations may include simulating a movement of a robotic component of a robotic device to a plurality of positions. For example, the simulated movement of the robotic component to the plurality of positions may be based on a predetermined motion plan associated with the robotic component. The operations may include determining a relationship between a simulated torque values and simulated force values at the plurality of positions. In one scenario, a respective position of the plurality of positions is associated with a respective simulated torque value and a respective simulated force value.

Determining the relationship between the simulated torque values and the simulated force values may comprise a regression analysis. By way of example, the regression analysis may comprise a linear regression, but need not be linear. Determining the relationship may also include constraints and additional costs that may be used to determine a correlation between simulated data and measured data.

The operations may include receiving detected force values by one or more sensors of the robotic component according to actuation of the robotic component to the plurality of positions. In one example, the respective position of the plurality of positions is associated with a respective detected force value according to a given sensor of the one or more sensors. In another example, a belt transmission may be coupled to the robotic component. In this example, the detected force values may be based according to a tension of the belt transmission based on a movement of the robotic component to a given position by an actuator. The operations may include determining expected torque values based on the detected force values and the determined relationship.

The operations may include comparing the expected torque values to the simulated torque values. In one scenario, the comparison of the expected torque values to the simulated torque values may include determining a difference between expected torque values and the simulated torque values. In this scenario, a potential fault associated with the one or more sensors may be determined according to the difference between the expected torque values and the simulated torque values. Based on the expected torque values satisfying a threshold associated with the simulated torque values, the operations may include determining a plurality of calibration parameters of the one or more sensors according to the determined relationship.

Referring now to the Figures, FIG. 1 is a block diagram illustrating an example system for control of a torque controlled actuator. The torque controlled actuator may be one of many components of a robotic device. As shown in FIG. 1, an encoder 102 may couple to a motor 104 that drives a belt transmission 106 of a single stage. A sensor 108 determines a belt tension sensor measurement, $F_{id}$, and outputs the belt tension sensor measurement to an amplifier 110. The belt tension sensor measurement may also be provided to one or more computing devices (not shown) for determining one or more calibration parameters associated with sensor 108. Another encoder 112 may couple to an output hub of the belt transmission 106 to sense a joint angle, $\Theta_j$, or load position. The encoders 102 and 112 may be optical encoders, Hall effect sensors, or other capacitive angle sensors, for example. The torque controlled actuator is controlled by the motor amplifier 110 that receives as inputs $\Theta_m$, the motor angle, the belt tension sensor measurement, $F_{id}$, and optionally $\Theta_j$, the joint angle, and outputs a commanded motor winding current, I, as a function of these inputs according to a control law module 114. The motor winding current, I, causes the motor 104 to drive the belt transmission 106 for an output torque, $T_q$, that is applied to a load 116.

The control law module 114 may transform state variables into command current to motor. A full state control or measure of a full state of the system (e.g., motor position with encoder, motor velocity, motor acceleration, joint position with encoder, output torque with load cells) can be utilized as a linear combination to calculate the command current. A servo-loop is created around tensor sensor values for torque applied at a joint. The control law module 114 may operate as a known proportional integral derivative (PID) module, for example. A PID controller may include a control loop feedback mechanism that calculates an error value as a difference between a measured process variable and a desired set point. The PID controller attempts to minimize the error by adjusting process control outputs. The PID controller algorithm may involve three separate constant parameters, including the proportional, the integral, and the derivative values, denoted P, I, and D. These values can be interpreted in terms of time: P depends on the present error, I on accumulation of past errors, and D is a prediction of future errors, based on current rate of change. A weighted sum of these three actions is used to adjust a process via a control element such as the output torque to be applied.

In one example, if less torque is desired, the amplifier 110 may lower the motor current to cause the motor 104 to drive the belt transmission 106 less strongly. For higher torque, the motor current may be increased. The motor current can be controlled as a continuous function of the sensed belt tension. Methods to achieve this include full state linear feedback with a dynamic model of the robotic and PID servo control. Additional control can be applied to accurately track a commanded joint position, torque, velocity, and/or impedance, for example.

The control law module 114, or other components of the design in FIG. 1, may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The control law module 114 may also be a computing device (or components of a computing device such as one or more processors), that may execute instructions to perform functions as described herein.

Within examples, operation of the torque controlled actuator can be modified for certain applications. For instance, if torque controlled actuator is in motion (e.g., is part of a moving link), then inertial effects of an idler may be coupled to a load cell if a mass of the idler is high. This interaction may be cancelled out in software by computing acceleration of the actuator using accelerometers or a kinematic model, inertial forces of the idler acting on the load cell, and a revised load value ($F_{ld}'$) that subtracts away the inertial effect.

Within other examples, the tension sensing may exhibit hysteresis effects due to rubber of the timing belt being in a load path between a rigid tensile core of the belt and the strain gauge. This hysteresis can limit overall accuracy of the sensor which may be important for some applications. A hysteresis model can be employed to improve sensor accuracy. Standard modeling techniques, such as a Preisach Operator, can be employed to continuously compute the hysteresis value online and calculate a revised load value, $F_{ld}'$, which cancels out the hysteresis.

Further, within other examples, the belt transmission 106 may be compliant and stretch under load, causing a displacement in output position from an expected position. Use of an output encoder enables measurement of the actual output position independent of the load. A model of belt stretch may be employed in addition to, or instead of, the joint encoder. The belt stretch model can take as an input the applied tension in the belt, physical parameters of the belt such as modulus of elasticity, and environmental parameters such as temperature of the belt. The belt stretch model may output an amount of elastic stretch in the belt such that commanded motor position can be adjusted and a desired output position achieved. The model may be as simple as a linear spring, or may include non-linear effects such as hysteresis. Alternatively, the belt stretch can be measured empirically across a range of working loads and a look-up table used to compute the motor position offset.

Figure 2:
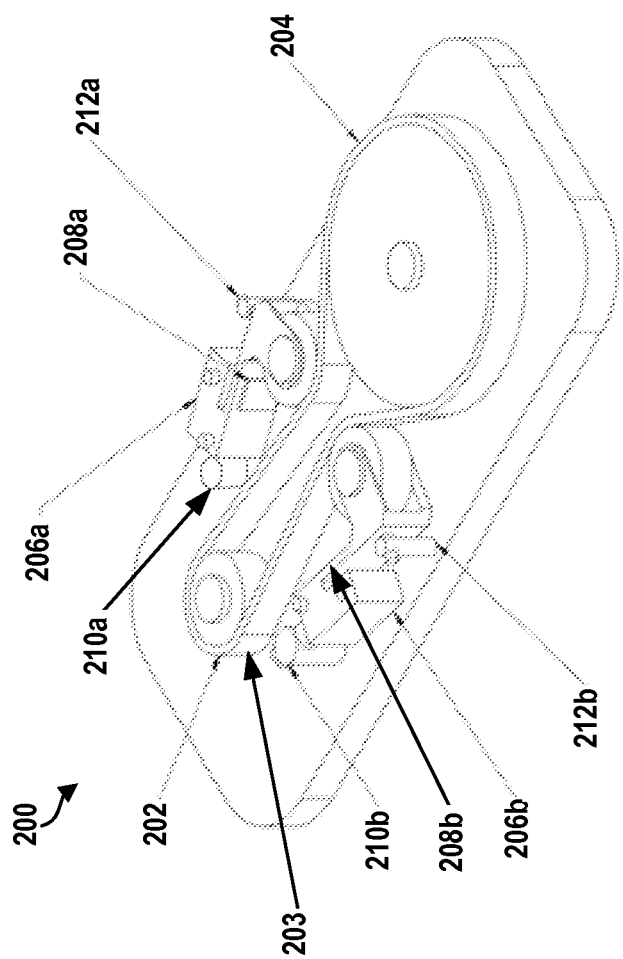
FIG. 2 illustrates an example output belt tension sensing system with a dual idler load cell.

FIG. 2 illustrates an example output belt tension sensing system 200 with a dual idler load cell. In one scenario, the output belt tension sensing system 200 may be one of a plurality of systems associated with a robotic device. As shown in FIG. 2, an input 202 is provided that comes from a motor or a previous stage (as shown in FIG. 1), and an output 204 is provided that may couple to a subsequent stage or a load. The input 202 may be coupled to a belt transmission 203. The belt transmission 203 may couple to the output 204.

In one example, the output belt tension sensing system 200 may comprise one or more sensors for measuring parameters associated with a robotic device. By way of example, the one or more sensors may include a load cell. In another example, the one or more sensors of the robotic device are coupled to one or more belt idlers. In this example, the one or more belt idlers are coupled to a belt transmission of the robotic device. By of example, the belt idlers may be positioned on an outer perimeter of the belt transmission at about a same angle with respect to the belt transmission.

As shown in FIG. 2, two load cell assemblies 206*a-b* are utilized, one on each side of the belt transmission 203. This provides redundant sensing and also permits one side of the belt transmission 203 to go slack, if desired. The load cell assemblies 206*a-b* include respective strain gauges 208*a-b*, tensioners 210*a-b*, and hardstops 212*a-b*.

In one scenario, the two load cell assemblies 206*a-b* may be used to determine a tension associated with the belt transmission 203. In this scenario, the belt transmission 203 may be coupled to a robotic component of a robotic device. The tension associated with the belt transmission 203 may be based on a movement of the robotic component to a given position according to the input 202. Data representative of the tension associated with the belt transmission 203 may be recorded at a plurality of positions associated with the robotic component based on the movement of the robotic component. Further, one or more computing devices may be configured to receive the data representative of the tension associated with the belt transmission 203.

By way of example, a relationship may be determined based on the estimated torque values and the estimated force values. Determining the relationship may comprise a linear regression. In this example, the linear regression may provide one or more gains and one or more biases. In another example, determining the relationship may include additional constraints used to assist in determining the one or more gains and the one or more biases. For instance, the gauge factor of the load cell assemblies 206*a-b* should be nearly the same and thereby can be included as a constraint when determining the relationship. Other examples are possible as well.

The one or more gains and the one or more biases may be used with measurements associated with strain gauges 208*a-b* in order to determine calculated torque values. The calculated torque values may be based on the data representative of the tension associated with belt transmission 203, the estimated torque values, and the estimated force values associated with the robotic device. The calculated torque values may be compared to a threshold. For example, the threshold may be indicative of a difference between the calculated torque values and the estimated torque values at the plurality of positions associated with the robotic component.

In one example, based on the calculated torque values satisfying the threshold, the one or more gains and the one or more biases may be associated with force measurements received at strain gauges 208*a-b*. Associating the one or more gains and the one or more biases with the strain gauges 208*a-b* may provide calibration of the strain gauges 208*a-b*. Calibration of the strain gauges 208*a-b* may enable one or more computing devices to calculate one or more torque values based on one or more detected force values at the strain gauges 208a-b.

In one example, determining the calculated torque values comprises calculating one or more gains and one or more biases associated with the one more sensors. Based on the configuration of the load cell assemblies 206a-b in FIG. 2, a combined calculated torque may be determined according to:

$$\tau = \alpha_1 f_1 + \alpha_2 f_2 + \beta. \quad [1]$$

In equation [1], the torque, $\tau$, is determined by adding a first calculated torque value, $\alpha_1 f_1$, a second calculated torque value, $\alpha_2 f_2$, and a combined bias, $\beta$. In one example, the one or more calibration parameters may comprise a first gain, $\alpha_1$, associated with a first force measurement, $f_1$, and a second gain, $\alpha_2$, associated with a second force measurement $f_2$. The first force measurement, $f_1$, determined by strain gauge 208a is multiplied with the first gain, $\alpha_1$, to provide the first calculated torque value. The second force measurement, $f_2$, determined by stain gauge 208b is multiplied with the second gain, $\alpha_2$, to provide the second calculated torque value. By way of example, the one or more calibration parameters may also include a first bias associated with the first force measurement, $f_1$, and a second bias associated with the second force measurement $f_2$. In this example, the first bias and the second bias may be combined to produce the combined bias, $\beta$.

In another example, a value associated with the first force measurement may be determined through the use of an analog-to-digital converter (ADC). The ADC may be configured to provide a raw analog count that is proportional to tension associated with belt transmission 203. Similarly, a second value associated with the second force measurement may also be determined through use of a second ADC.

In another scenario, in order to determine the calculated torque values, one or more computing devices may receive sensor configuration information associated with the strain gauges 208a-b. In this scenario, the sensor configuration comprises an orientation of a given strain gauge of the strain gauges 208a-b with respect to the belt transmission 203. Based on one or more possible configurations of a given load cell assembly, the sensor configuration may be used when determining a force measurement in order to improve an accuracy associated with the force measurement. By way of example, the orientation of the given strain gauge may be measured from a computer model of the robotic component.

In another scenario, one or more computing devices may be configured to compare the first force measurement from the strain gauge 208a to the second force measurement from the stain gauge 208b. The one or more computing devices may be configured to determine a difference between the first force measurement and the second force measurement. Further, based on the difference, the one or more computing devices may determine whether the difference satisfies a force threshold. In one example, based on a given operation of the output belt tension sensing system 200, the first force measurement and the second force measurement may be expected to be within a certain value of force. By way of example, if the first force measurement differs significantly from the second force measurement and thereby satisfies the force threshold, then it may be indicative of a potential fault with the robotic component. In this example, an alert indicative of the potential fault may be provided to an individual by the one or more computing devices.

FIGS. 3A-3B illustrate side and internal views of another example actuator system 300. In FIG. 3A, a torque controlled actuator is illustrated in a clamshell structure 302, and an internal view of the torque controlled actuator is shown. The torque controlled actuator may be similar to the torque controlled actuator shown in FIG. 1, and is shown utilizing a tensioning system similar to FIG. 2. FIG. 3B illustrates the torque controlled actuator, and a motor 304 couples to an end and extends out of the clamshell structure. An output hub 306 extends out of the other end of the clamshell structure.

Figure 3C:
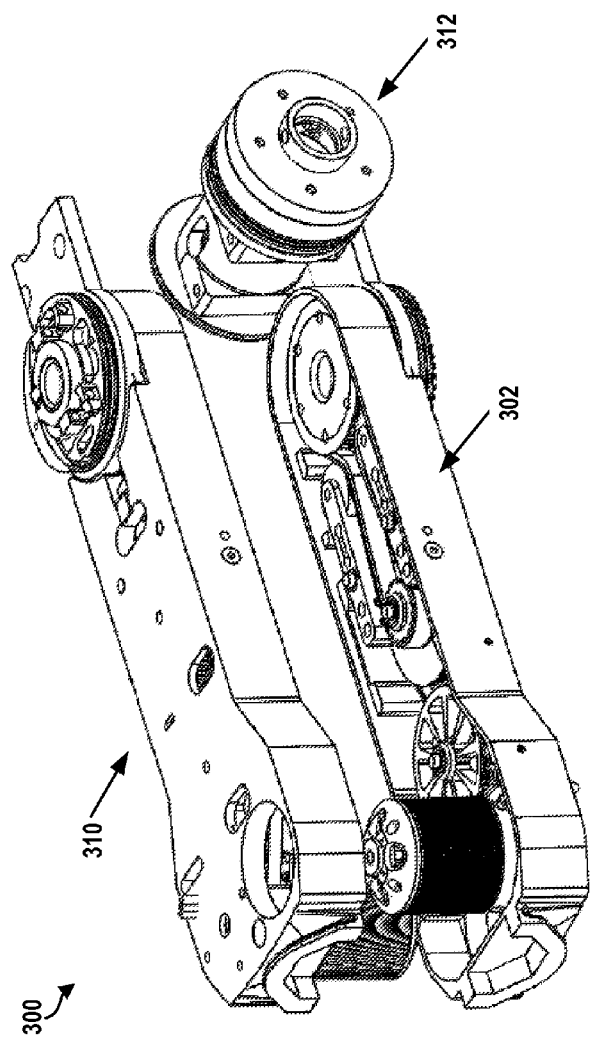
FIGS. 3C-3D illustrate the example actuator system in FIGS. 3A-3B in an enclosure.
Figure 3D:
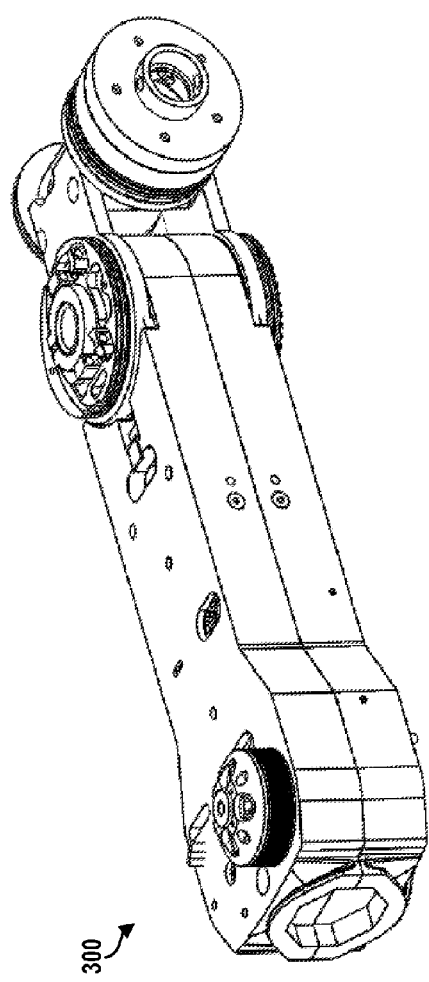

FIGS. 3C-3D illustrate the example actuator system 300 in FIGS. 3A-3B in an enclosure. The clamshell structure includes a cover 310 that couples to the structure 302. Thus, two such clamshell modules bolt together to form a link structure, and a cable differential 312 couples to an end of the link structure.

FIGS. 3A-3D illustrate an exoskeleton structure for the torque controlled actuator, for example.

Within examples, the two torque controlled actuators 302a-b arranged side-by-side as shown in FIGS. 3A-3B create a link of a robot arm. Outputs of these actuators drive a differential mechanism to create a 2 DOF actuated joint. This link is modular in that several such links can be connected end-to-end to form a robot manipulator or other such systems.

Angle sensors, such as optical encoders, can be employed at the two outputs of the differentials rather than an output of the torque controlled actuators. This allows for stretch of the cable or slop in gears of the differential to be measured and compensated for in control, improving the control accuracy.

In some examples, a control bus, sensor and power cables can be routed to subsequent links through a center of shafts of the differential. In particular, the differential input shaft can have a cutaway at a center to allow cable entry. A cable harness enters at the center of the shaft and exists end of the shaft. Next, the cable harness runs through each end of the differential output shaft and on to the next link, for example.

The example system 300 shown in FIGS. 3A-3B includes three belt stages. Each stage comprises a timing belt and two timing pulleys mounted on rolling bearings or bushings. Alternate designs may include non-belt stages (e.g., gears) with the effect of potentially limiting the zero backlash characteristic. It is desirable that a width of each belt increase in proportion to an expected working load of that transmission stage to ensure long lifetime of the transmission.

The example system 300 shown in FIGS. 3A-3B also may be operated such that each belt stage is tensioned to greater than 50% of the working load of the transmission to ensure that each stage does not go slack during normal operation. Use of position sensors at the output and also the motor provides redundancy and enables detection of transmission failure modes such as belt breakage. It also enables compensation of the stretch of the belts in the transmission under load. If encoders are used on the motor and joint position, the joint position may be micro-stepped between each tick of the joint encoder to achieve higher precision. This can be accomplished by incrementally advancing the motor position according to the motor encoder (i.e., assuming that the motor encoder resolution multiplied by the gear ratio is greater than joint encoder resolution). Two load cells may be employed on each side of the output belt at about a same angle with respect to the belt transmission. This may enable belt pretension to be measured and reported, enabling preemptive service of the transmission if the pretension needs to be adjusted. Redundant sensing also allows for detection of failures in the transmission, and common mode variations in the sensors (such as a temperature bias) can be subtracted out. In these designs, the motor may also be positioned away from the actuator output, allowing flexibility in the actuator mass distribution.

Figure 4:
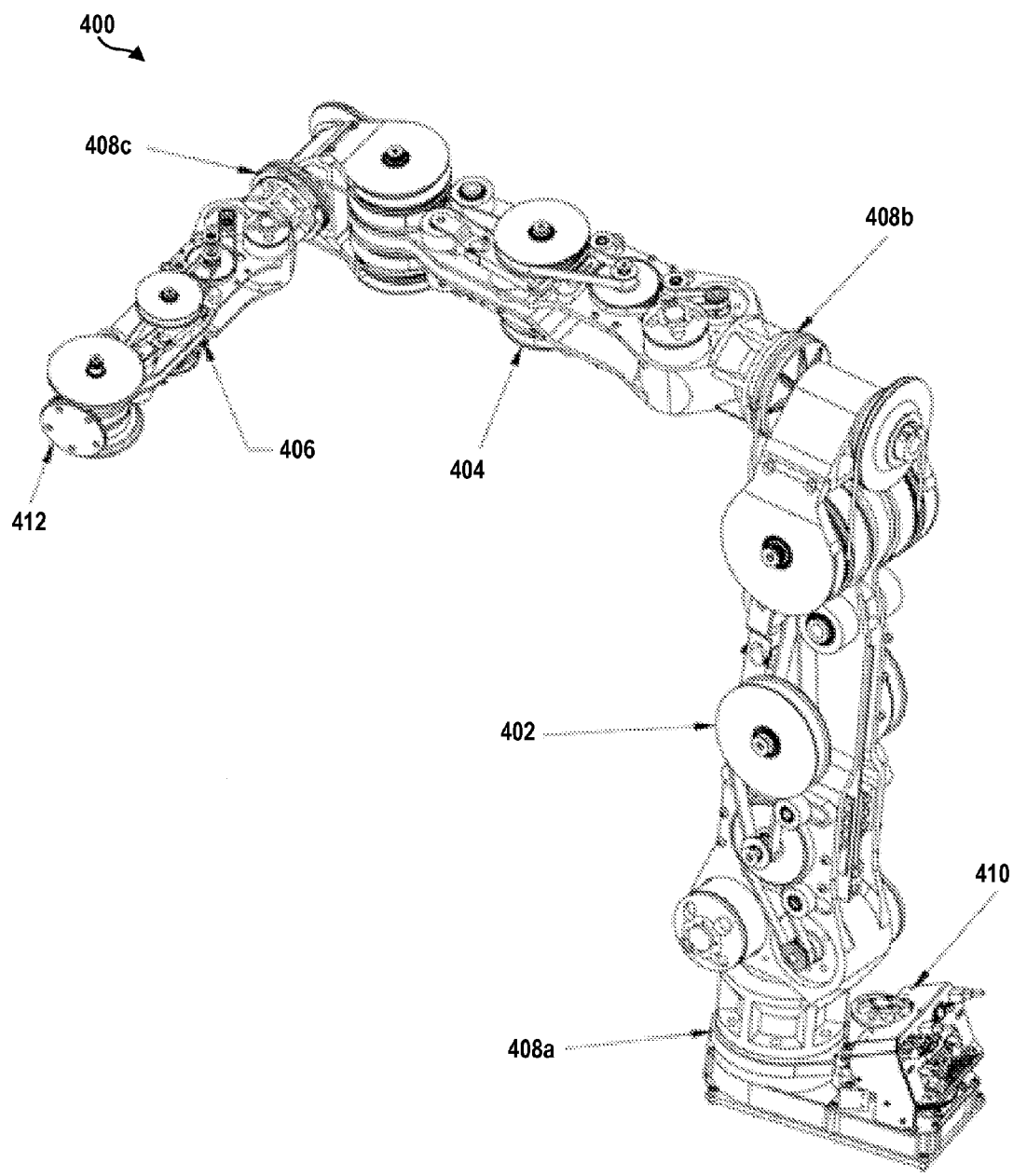
FIG. 4 is an example robot manipulator.

FIG. 4 is an example robot manipulator 400. In one example, the robot manipulator 400 is a seven DOF robot arm. As described, two torque controlled actuators comprise a link or actuator system, and three links together form an arm. Thus, the robot manipulator may be an actuator system that includes multiple modular links arranged in serial. As shown in FIG. 4, each modular link includes multiple torque controlled actuators arranged side-by-side. A respective torque controlled actuator includes one or more timing belt stages coupled in serial including an input stage for coupling to a motor and an output stage for coupling to a load, and the one or more timing belt stages couple rotation of the motor to rotation of an output of the output stage. Each modular link also includes an interface to couple the multiple torque controlled actuators in the side-by-side arrangement, and a differential coupled to outputs of the multiple torque controlled actuators to create a two degree of freedom (DOF) actuated joint.

The robot manipulator 400 includes multiple modular links 402, 404, and 406, and link interfaces 408a-c to couple the multiple modular links 402, 404, and 406 in serial and to provide a multiple DOF robot manipulator. The robot manipulator 400 may be a 7 DOF robot arm including three modular links arranged in a serial chain. An additional 1 DOF actuator 410 (e.g., such as shown in FIG. 2 including a single timing belt stage) may be employed at a root of the chain. The robot manipulator 400 may be oriented such that the arm has a kinematic structure including base link (e.g., actuator 410) to operate as a shoulder pan, a trunk link (e.g., link 402) to operate as a shoulder pitch and shoulder roll, a bicep link (e.g., link 404) to operate as an elbow pitch and forearm roll, and a forearm link (e.g., link 406) to operate as a wrist pitch and wrist roll or yaw. A gripper interface 412 may be provided at an end of the link 406 to attach any gripper mechanism as desired for a particular application.

By way of example, link 406 may be actuated by a given torque controlled actuator coupled to link 406. In this example, a calibrated mass may be coupled to the gripper interface 412 in order to measure data using a predetermined calibrated mass. With the calibrated mass coupled to link 406, link 406 may be actuated to one or more positions based on a motion plan. According to the motion plan, one or more sensors may be configured to determine data associated with the calibrated mass and the given torque controlled actuator.

Within examples, the robot manipulator 400 may include torque control and passive compliance for each joint enabling control strategies for safe operation next to people, and low gear ratios for high dynamic performance and low effective inertia. In other examples, the robot manipulator 400 may have simple cable routing through a center of joints, and zero backlash transmissions for good precision.

The links 402, 404, and 406 may be joined with a quick-connect type interface, allowing the arm to be quickly taken apart for service. Each quick-connect has electrical connectors to pass signal and power to the electronics, and also has a mechanical latch and features to securely transmit load between links.

Figure 5B:
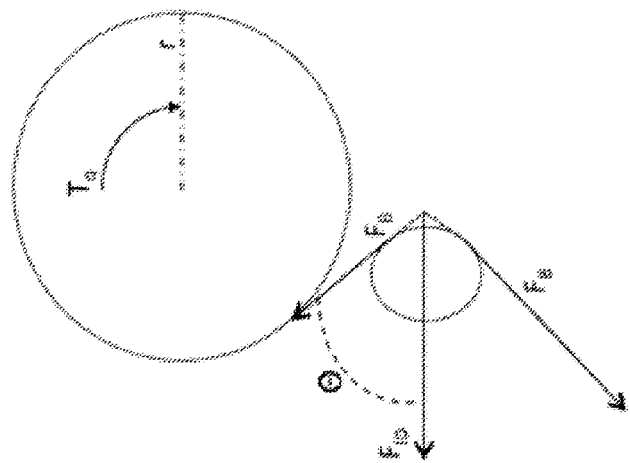
FIG. 5B is a diagram showing an example calculation of the output torque.
Figure 5A:
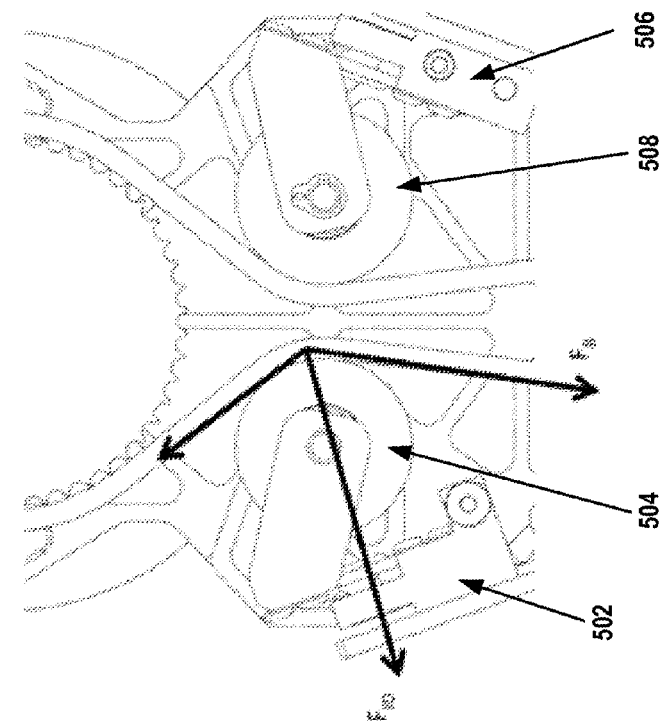
FIG. 5A is a diagram illustrating an example portion of a timing belt stage and determination of applied load.

FIG. 5A is a diagram illustrating an example portion of a timing belt stage and determination of applied load, and FIG. 5B is a diagram showing an example calculation of the output torque. As shown in FIGS. 5A-5B, applied load to a load cell 502, $f_{id}$, can be calculated as a function of applied output torque $T_q$ as follows:

$$f_{id} = 2f_B \cos(\Theta) \quad [2]$$

$$f_b = T_q/r \quad [3]$$

Referring to equation [2], $f_{id}$ is a normal force applied to load cell 502, $f_b$, is a working tension on the belt, r is an output hub radius, and $\Theta$ is an angle of the belt to the load cell normal. (Although the angle $\Theta$ is shown to be perpendicular to applied force, additional bias may be considered as well to be based on force applied at an angle offset from perpendicular, for example). It may be desired that the angle $\Theta$ of the belt on an idler 504 is as small as possible to increase a magnitude of a signal applied to a sensor of the load cell 502. The sensor may be a traditional strain gauge sensor or any other form of load measurement sensor. The force applied to a second load cell 506 of a second idler 508 may be determined in a similar manner by using equation [2] and equation [3]. Other examples for determining the force applied may be possible as well.

By way of example, a computer model of a robotic component may be used to perform simulations and determine a simulated force applied to a given load cell according to a simulated output torque. In this example, the simulated output torque may be determined according to a simulated operation of an actuator coupled to a belt transmission of the robotic component. The computer model may include various measurements of lengths and masses associated with one or more components associated with the robotic component. Performing a simulation of the computer model may be used to determine a simulated value of the force applied to the given load cell and a simulated value of the applied output torque. Other variables that may affect operation of the load cell such as temperature may be simulated as well in order to determine how to compensate for changes in temperature.

In another example, a computer model of the robot manipulator 400 of FIG. 4 may be received by one or more computing devices in order to simulate operation of the robot manipulator 400. In one example, link 406 may be actuated to a plurality of positions based on a simulated motion plan. At each position of the plurality of positions, the one or more computing devices may be configured to determine a simulated output torque value associated with the link 406 and record the simulated torque value. In addition, the one or more computing devices may also be configured to determine a simulated force value applied to a given load cell at each position of the plurality of positions.

Figure 6A:
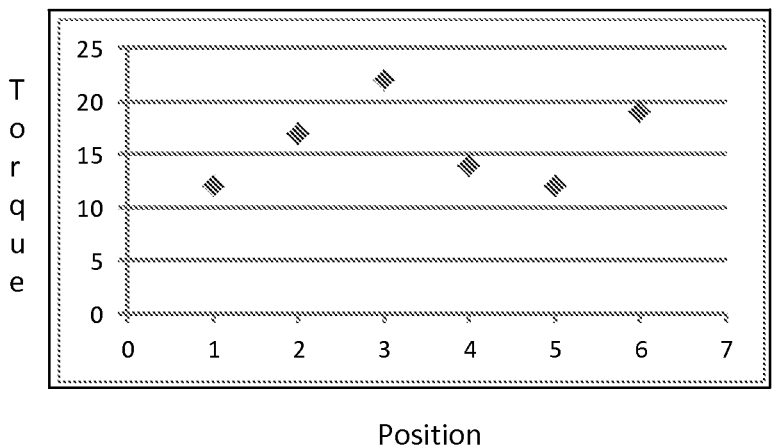
FIGS. 6A and 6B illustrate example graphs depicting estimate torque values and estimated force values.
Figure 6B:
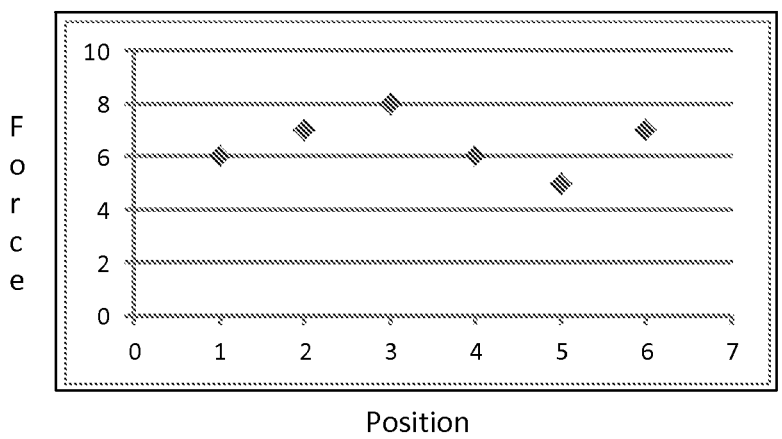

FIGS. 6A and 6B illustrate example graphs depicting estimated torque values and estimated force values according to a given position of a given component of a robotic device. In one scenario, the simulated torque values may be determined according to a computer simulation of the given component of the robotic device. For instance, the computer simulation may incorporate masses and lengths associated with the given component along with various operating parameters such as a current supplied to an actuator in order to determine a simulated output torque. By way of example, the simulated force applied to a given load cell may be determined according to the determined output torque and equation [2] from above.

Figure 6C:
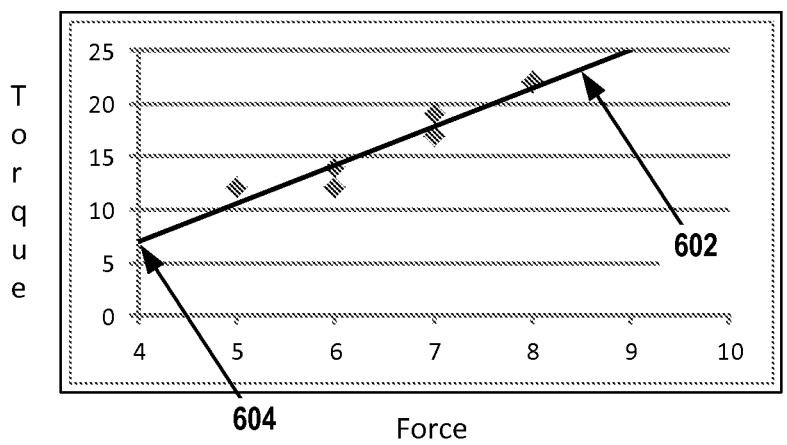
FIG. 6C illustrates an example graph depicting a relationship between the estimated torque value and the estimated torque value.

FIG. 6C illustrates an example graph depicting a relationship between the simulated torque value and the simulated force value. The data points within FIG. 6C are based on a simulated torque value at a given position from FIG. 6A and a simulated force value at the given position from FIG. 6B.

By way of example, the data shown in FIGS. 6A and 6B may be determined according to one or more computing devices by simulating operation of a computer model based on a robotic device.

Referring to FIG. 6C, a regression analysis which may include a linear regression may be performed on the simulated torque values and the simulated force values. The linear regression may be used to determine a fitted line 602 amongst the simulated torque values and the simulated force values. The fitted line 602 may be used to determine a relationship between the simulated torque values and the simulated force values. For example, the slope of the fitted line 602 and an intercept 604 may be used to determine a given output torque based on a measured force at a load cell. In one example, the simulated torque value may be determined according to:

$$\tau_{Sim} = \alpha_{Slope} f_{Sim} + \beta_{Int}. \qquad [4]$$

Referring to equation [4], the simulated torque value, $\tau_{Sim}$, may be based on a product between the slope of the fitted line 602, $\alpha_{Slope}$, and the simulated force value, $f_{Sim}$, that is added to the intercept 604, $\beta_{Int}$.

Figure 7:
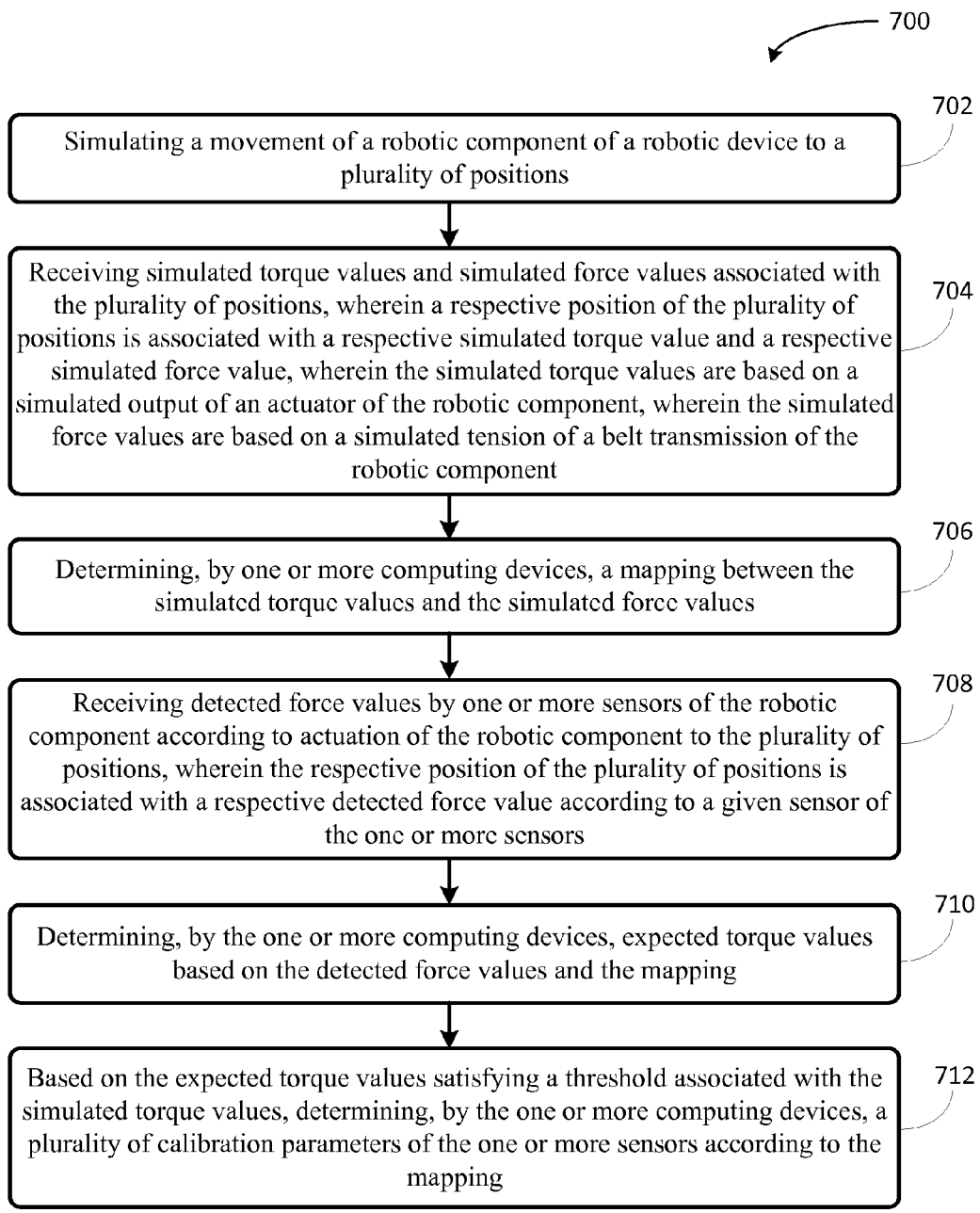
FIG. 7 is a flowchart illustrating an example method for calibrating a parameter of an example sensor.

FIG. 7 is a block diagram of an example method for determining one or more calibration parameters of one or more sensors in accordance with at least some embodiments described herein. Method 700 may include one more operations, functions, or actions as illustrated by one or more of blocks 702-714. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 700 and other processes and methods disclosed herein, each block in FIG. 7 may represent circuitry that is wired to perform the specific logical functions in the process. Illustrative methods, such as method 700, may be carried out in whole or in part by a component or components in the cloud and/or a robotic system, such as by the one or more of the components of the system 100 shown in FIG. 1. However, it should be understood that example methods, such as method 700, may be carried out by other entities or combinations of entities (i.e., by other computing devices and/or combinations of computing devices), without departing from the scope of the invention.

For example, functions of the method 700 may be fully performed by a computing device (or components of a computing device such as one or more processors), or may be distributed across multiple components of the computing device, across multiple computing devices, and/or across a server. In some examples, the computing device may receive information from sensors of the robotic device, or where the computing device is a server the information can be received from another device that collects the information. As other examples, the method 700 may be performed by a computing device, by a server, or by a robotic device.

As shown by block 702, method 700 includes simulating a movement of a robotic component of a robotic device to a plurality of positions. In one example, the simulation may be a computer simulation that includes external measurements and lengths of the robotic component as well as operating parameters associated with the robotic device. The simulation may be performed according to a desired operation of the robotic device.

As shown by block 704, method 700 includes receiving simulated torque values and simulated force values associated with the plurality of positions, wherein a respective position of the plurality of positions is associated with a respective simulated torque value and a respective simulated force value, wherein the simulated torque values are based on a simulated output of an actuator of the robotic component, wherein the simulated force values are based on a simulated tension of a belt transmission of the robotic component. In one example, the simulated torque values and the simulated force values may be determined according to a computer simulation of the robotic component. By way of example, the movement of the robotic component to the plurality of positions may be determined according to a specific trajectory associated with a simulated operation of the robotic component.

As shown by block 706, method 700 includes determining, by one or more computing devices, a mapping between the simulated torque values and the simulated force values. In one scenario, the mapping may be defined according to equation [4] from above. In another scenario, the one or more computing devices may be configured to determine the simulated force values based on the simulated torque values. For example, the simulated force values may be determined according to equation [2] and equation [3] from above.

As shown by block 708, method 700 includes receiving detected force values by one or more sensors of the robotic component according to actuation of the robotic component to the plurality of positions, wherein the respective position of the plurality of positions is associated with a respective detected force value according to a given sensor of the one or more sensors. The plurality of positions may be determined according to a motion plan that serves to highlight sensitivity associated with the one or more sensors when detecting one or more force measurements. By way of example, the plurality of positions associated with the one or more force measurements may correlate to the plurality of positions associated with the simulated torque values and the simulated force values.

By way of example, various metrics associated with the robotic component may also be used to determine a plurality of simulated torque values. For instance, a velocity and an acceleration associated with the movement of the robotic component may be used to help resolve issues that might be introduced by friction and hysteresis when comparing the one or more force measurements at the plurality of positions with the plurality of simulated torque values and the plurality of simulated force values at the plurality of positions.

As shown by block 710, method 700 includes determining, by one or more computing devices, expected torque values based on the detected force values and the mapping. By way of example, the detected force measurement may be converted into one or more expected torque values according to equation [4] from above. In this example, the one or more gains may be based on $\alpha_{Slope}$ and the one or more biases may be based on $\beta_{Int}$. The one or more gains and the one or more biases may be determined according to the mapping. In another scenario, the expected torque values may be determined according to equation [1] from above depending on the number of sensors.

By way of example, the expected torque values may be compared to the simulated torque values. In one scenario, the comparison may further include satisfying a threshold. Satisfying the threshold may be used to determine whether the given actuator of the robotic component is operating according to the expected behavior. For instance, if the threshold is exceeded by 50 Newtons, then it may be determined that additional power is being supplied to a given actuator based on an unknown reason. In this instance, exceeding the threshold may cause the one or more computing devices to provide a signal to power down the given actuator of the robotic component.

As shown by block 712, method 700 includes based on the expected torque values satisfying a threshold associated with the simulated torque values, determining, by the one or more computing devices, a plurality of calibration parameters of the one or more sensors according to the mapping. By way of example, the one or more calibration parameters may include one or more gains and one or more biases associated with the one or more sensors. The calibration parameters may enable a detected force value to be converted into an expected torque value.

Figure 8:
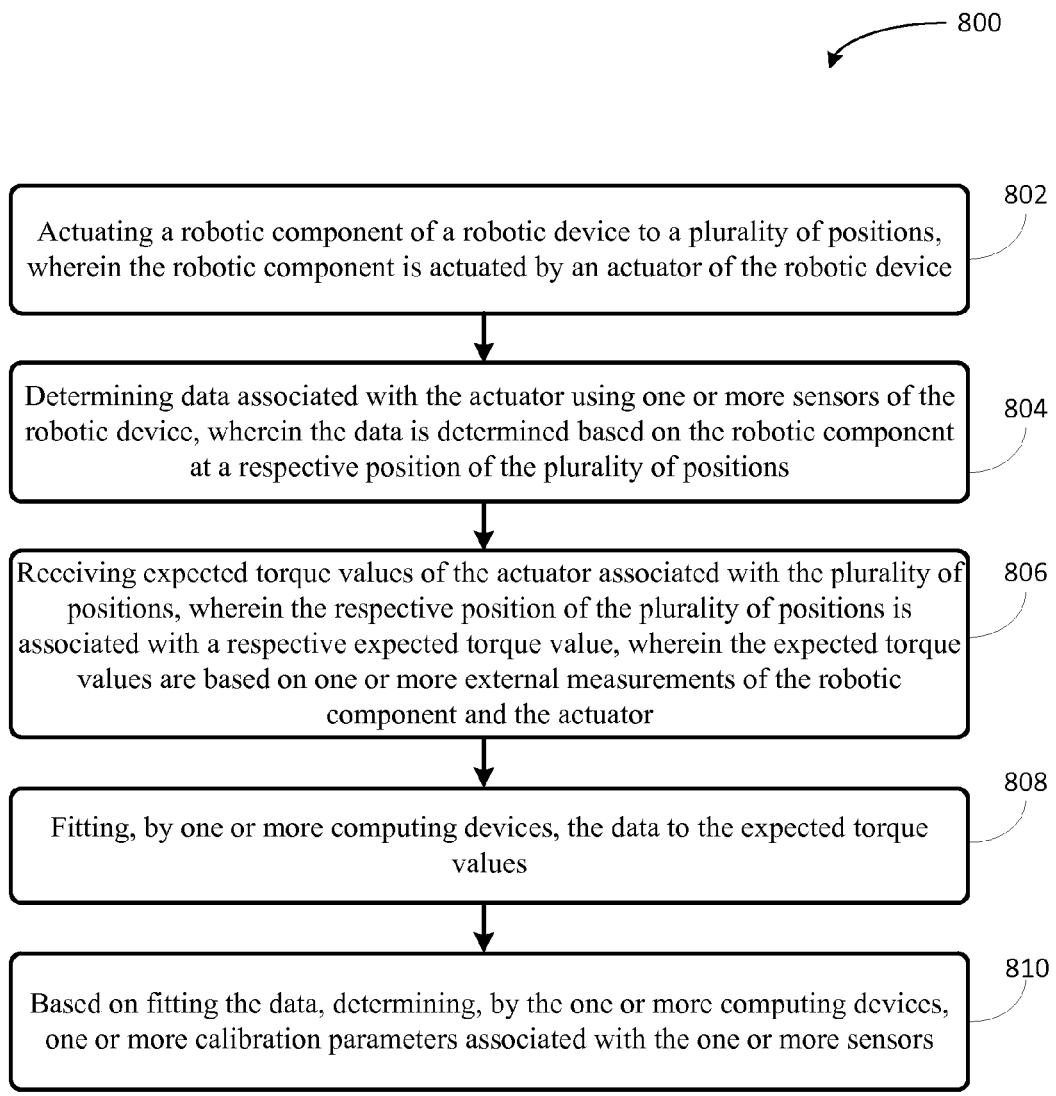
FIG. 8 is another flowchart illustrating another example method for calibrating a parameter of another example sensor.

FIG. 8 is a block diagram of an example method for determining one or more calibration parameters of one or more sensors, in accordance with at least some embodiments described herein. Method 800 may include one more operations, functions, or actions as illustrated by one or more of blocks 802-810. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

As shown by block 802, method 800 includes actuating a robotic component of a robotic device to a plurality of positions, wherein the robotic component is actuated by an actuator of the robotic device. By way of example, actuating the robotic component may include coupling a calibrated mass to the robotic component and actuating the robotic component to one or more positions based on a motion plan. The motion plan may be based on an intended operation of the robotic component.

As shown by block 804, method 800 includes determining data associated with the actuator using one or more sensors of the robotic device, wherein the data is determined based on the robotic component at a respective position of the plurality of positions. In one example, the one or more sensors of the robotic device comprise a strain gauge. The strain gauge may be used to measure the data associated with the actuator. In another example, the data comprises a force measurement based on a tension of a belt transmission of the robotic device. In this example the belt transmission is coupled to the actuator.

Within examples, one or more temperature sensors may be configured for determining a temperature associated with the actuator actuating the robotic component to the given position. The one or more computing devices may be configured for determining whether the temperature satisfies a temperature threshold. In one example, an increase in temperature by ten degrees Celsius may correlate to a change in resistance associated with a given strain gauge. By way of example, the one more computing devices may receive data indicative of possible errors associated with a given strain gauge based on changes in temperature. Further, based on the temperature satisfying the temperature threshold, the one or more computing devices may adjust the data according to a temperature correction curve. In one example, the temperature correction curve may provide guidance to adjust the data by a given amount based on a given increase of the temperature. Adjusting that data according to the temperature may help to reduce errors associated with a force measurement at a strain gauge.

In one scenario, the one or more computing devices may be configured for determining one or more calculated torque values based on fitting the data. The one or more computing devices may be configured for identifying a relationship between the one or more calculated torque values and the expected torque values. In one example, the relationship may help to determine if the one or more calculated torque values are within a given range of the one or more expected torque values. By way of example, the one or more computing devices may be configured to calculate a difference between the one or more calculated torque values and the expected torque values at one or more positions in order to identify the relationship. The one or more positions may be selected based on sensitivity associated with a given sensor and a given orientation of the robotic component. Based on the relationship, the one or more computing devices may be configured for determining whether the fitted data satisfies a threshold that is indicative of a correlation between the one or more calculated torque values and the expected torque values.

As shown by block 806, method 800 includes receiving expected torque values of the actuator associated with the plurality of positions, wherein the respective position of the plurality of positions is associated with a respective expected torque value, wherein the expected torque values are based on one or more external measurements of the robotic component and the actuator. In one example, the external measurements may be lengths and masses of the robotic component. In another example, the expected torque values may be determined according to other sensors associated with the robotic component.

As shown by block 808, method 800 includes fitting, by one or more computing devices, the data to the expected torque values. In one example, fitting the data may comprise a regression analysis. In this example, the regression analysis provides one or more gains and one or more biases associated with the data. By way of example, the regression analysis is performed on the expected torque values and expected force values by determining a fitted line as shown in FIG. 6C.

As shown by block 810, method 800 includes based on fitting the data, determining, by the one or more computing devices, one or more calibration parameters associated with the one or more sensors. In one scenario, the one or more calibration parameters may enable a calculated torque value to be determined based on force measurements detected by the one or more sensors. In this scenario, the calculated torque value may be determined according to equation [1] from above.

Figure 9:
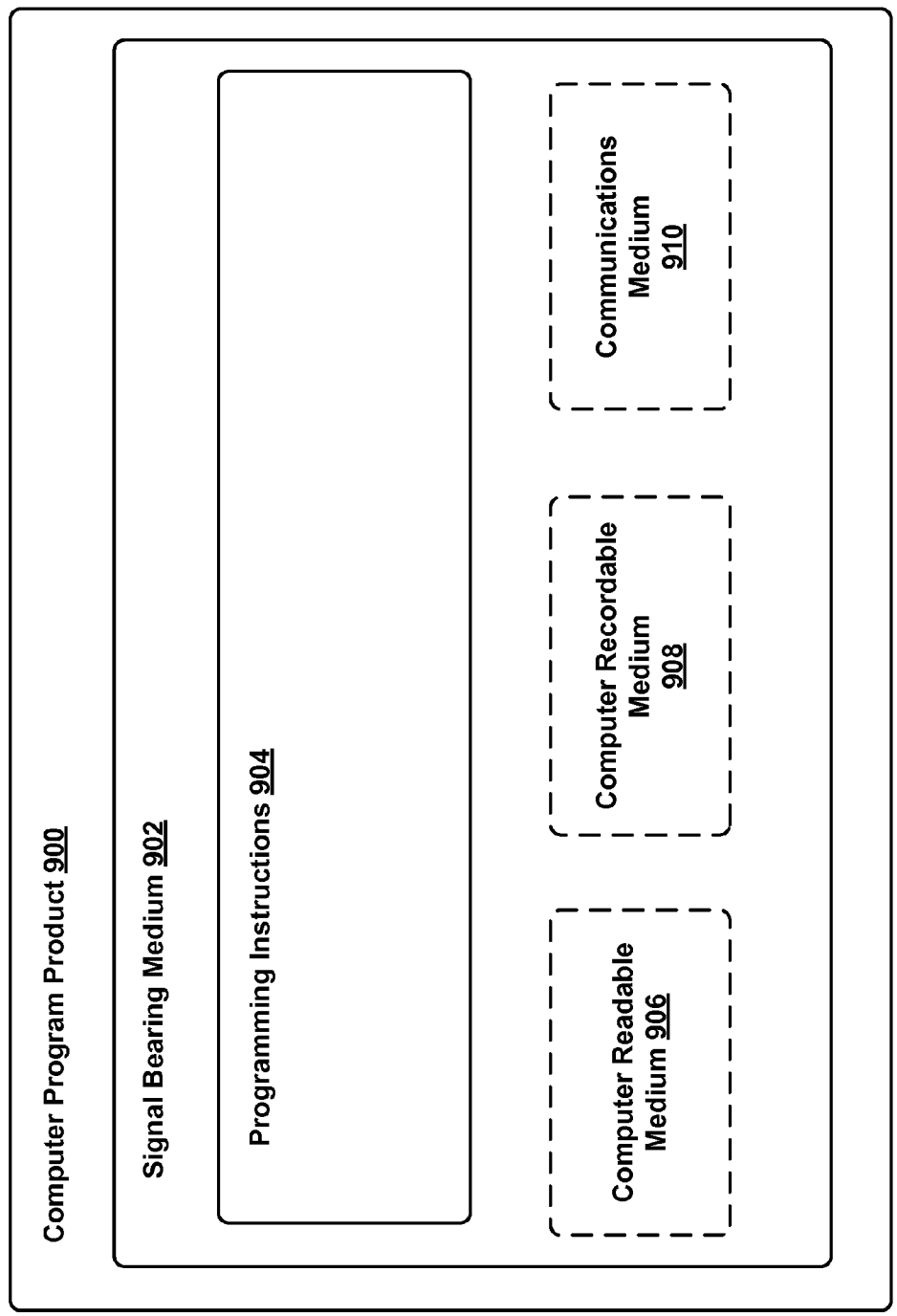
FIG. 9 depicts an example computer readable medium configured according to an example embodiment.

FIG. 9 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the system 100, robot manipulator 400, method 700, method 800, etc.) may be implemented by computer program instructions encoded on a computer readable storage media in a machine-readable format, or on other media or articles of manufacture. FIG. 9 is a schematic illustrating a conceptual partial view of an example computer program product that includes a computer program for executing a computer process on a computing device, arranged according to at least some embodiments disclosed herein.

In one embodiment, the example computer program product 900 is provided using a signal bearing medium 902. The signal bearing medium 902 may include one or more programming instructions 904 that, when executed by one or more processors may provide functionality or portions of the functionality described above with respect to FIGS. 1-8. In some examples, the signal bearing medium 902 may be a computer-readable medium 706, such as, but not limited to, a hard disk drive, a Compact Disc (CD), a Digital Video Disk (DVD), a digital tape, memory, etc. In some implementations, the signal bearing medium 902 may be a computer recordable medium 908, such as, but not limited to, memory, read/write (R/W) CDs, R/W DVDs, etc. In some implementations, the signal bearing medium 902 may be a communication medium 910 (e.g., a fiber optic cable, a waveguide, a wired communications link, etc.). Thus, for example, the signal bearing medium 902 may be conveyed by a wireless form of the communications medium 910.

The one or more programming instructions 904 may be, for example, computer executable and/or logic implemented instructions. In some examples, a computing device may be configured to provide various operations, functions, or actions in response to the programming instructions 904 conveyed to the computing device by one or more of the computer readable medium 906, the computer recordable medium 908, and/or the communications medium 910.

The computer readable medium 906 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system comprising:
   at least one processor; and
   data storage comprising instructions executable by the at least one processor to cause the system to perform operations comprising:
      simulating a movement of a robotic component of a robotic device to a plurality of positions;
      determining a relationship between simulated torque values and simulated force values at the plurality of positions, wherein a respective position of the plurality of positions is associated with a respective simulated torque value and a respective simulated force value;
      receiving detected force values by one or more sensors of the robotic component according to actuation of the robotic component to the plurality of positions, wherein the respective position of the plurality of positions is associated with a respective detected force value according to a given sensor of the one or more sensors
      determining expected torque values based on the detected force values and the determined relationship; and
      based on the expected torque values satisfying a threshold associated with the simulated torque values, determining, a plurality of calibration parameters of the one or more sensors according to the determined relationship, wherein the plurality of calibration parameters include one or more of a gain and a bias associated with the one or more sensors.

2. The system of claim 1, wherein determining the plurality of calibration parameters comprises:
   determining a fitted line between the simulated torque values and the simulated force values, wherein the fitted line is determined according to a linear regression; and
   based on the fitted line, determining a plurality of gains and a plurality of biases associated with the one or more sensors.

3. The system of claim 1, wherein the detected force values are based on a tension of a belt transmission according to actuation of the robotic component to the plurality of positions by an actuator coupled to the robotic component.

4. The system of claim 1, wherein the threshold is indicative of a difference between the simulated torque values and the expected torque values at the plurality of positions associated with the robotic component.

5. The system of claim 1, wherein determining the relationship comprises a regression analysis.

6. The system of claim 1, further comprising:
   a belt transmission coupled to an actuator, wherein the actuator is coupled to the robotic component; a plurality of belt idlers coupled to the belt transmission, wherein the belt idlers are positioned on an outer perimeter of the belt transmission at about a same angle with respect to the belt transmission.

7. The system of claim 1, wherein determining the expected torque values further comprises:
receiving sensor configuration information associated with the one or more sensors, wherein the sensor configuration comprises an orientation of a given sensor with respect to a belt of a belt transmission coupled to an actuator of the robotic component; and
adjusting the detected force values based on the sensor configuration.

8. A method comprising:
simulating a movement of a robotic component of a robotic device to a plurality of positions;
receiving simulated torque values and simulated force values associated with the plurality of positions, wherein a respective position of the plurality of positions is associated with a respective simulated torque value and a respective simulated force value, wherein the simulated torque values are based on a simulated output of an actuator of the robotic component, wherein the simulated force values are based on a simulated tension of a belt transmission of the robotic component;
determining, by one or more computing devices, a mapping between the simulated torque values and the simulated force values;
receiving detected force values by one or more sensors of the robotic component according to actuation of the robotic component to the plurality of positions, wherein the respective position of the plurality of positions is associated with a respective detected force value according to a given sensor of the one or more sensors;
determining, by the one or more computing devices, expected torque values based on the detected force values and the mapping;
based on the expected torque values satisfying a threshold associated with the simulated torque values, determining, by the one or more computing devices, a plurality of calibration parameters of the one or more sensors according to the mapping, wherein the plurality of calibration parameters include one or more of a gain and a bias associated with the one or more sensors; and
performing an operation for calibrating the one or more sensors based on the plurality of calibration parameters.

9. The method of claim 8, further comprising:
wherein the threshold is based on a difference between the expected torque values and the simulated torque values at one or more positions of the plurality of positions.

10. The method of claim 8, wherein the one or more sensors of the robotic device are coupled to one or more belt idlers, wherein the one or more belt idlers are coupled to a belt transmission of the robotic device.

11. The method of claim 8, wherein the one or more calibration parameters comprise a first gain associated with a first force measurement of a first sensor of the one or more sensors, a second gain associated with a second force measurement of a second sensor of the one or more sensors, a first bias associated with the first force measurement of the first sensor, and a second bias associated with the second force measurement of the second sensor.

12. The method of claim 8, further comprising:
comparing a first force measurement from a first sensor to a second force measurement from a second sensor;
determining a difference between the first force measurement and the second force measurement; and
based on the difference, determining whether the difference satisfies a threshold, wherein satisfying the threshold is indicative of a potential fault with the robotic component.

13. A method comprising:
actuating a robotic component of a robotic device to a plurality of positions, wherein the robotic component is actuated by an actuator of the robotic device;
determining data associated with the actuator using one or more sensors of the robotic device, wherein the data is determined based on the robotic component at a respective position of the plurality of positions;
receiving expected torque values of the actuator associated with the plurality of positions, wherein the respective position of the plurality of positions is associated with a respective expected torque value, wherein the expected torque values are based on one or more external measurements of the robotic component and the actuator;
fitting, by one or more computing devices, the data to the expected torque values; and
based on fitting the data, determining, by the one or more computing devices, one or more calibration parameters associated with the one or more sensors, wherein the one or more calibration parameters include one or more of a gain and a bias associated with the one or more sensors; and
performing an operation for calibrating the one or more sensors based on the one or more calibration parameters.

14. The method of claim 13, further comprising:
determining one or more calculated torque values based on fitting the data;
identifying a relationship between the one or more calculated torque values and the expected torque values; and
based on the relationship, determining whether the fitted data satisfies a threshold, wherein the threshold is indicative of a correlation between the one or more calculated torque values and the expected torque values.

15. The method of claim 13, wherein fitting the data to the expected torque values comprises a regression analysis.

16. The method of claim 15, wherein the regression analysis provides the one or more of the gain and the bias associated with the data.

17. The method of claim 16, wherein the regression analysis is performed on the expected torque values and expected force values.

18. The method of claim 13, wherein the data comprises a force measurement based on a belt transmission of the robotic device, wherein the belt transmission is coupled to the actuator.

19. The method of claim 13, wherein actuating the robotic component further comprises:
coupling a calibrated mass to the robotic component; and
actuating the robotic component to one or more positions based on a motion plan.

20. The method of claim 13, further comprising:
determining a temperature associated with the actuator actuating the robotic component to the given position by one or more temperature sensors;
determining whether the temperature satisfies a threshold; and
based on the temperature satisfying the threshold, adjusting the data according to a temperature correction curve.

* * * * *